Patented Mar. 28, 1933

1,902,867

UNITED STATES PATENT OFFICE

MAX ALBERT KUNZ, OF MANNHEIM, AND KARL KOEBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

ALLO-MS-NAPHTHODIANTHRONES

No Drawing. Application filed November 30, 1929, Serial No. 410,869, and in Germany December 8, 1928.

The present invention relates to the halogenation of allo-ms-naphthodianthrones.

We have found that halogen derivatives which are very valuable as dyestuffs or as intermediate products for the production of dyestuffs, are obtained in a simple manner, easily carried out on an industrial scale, by acting on allo-ms-naphthodianthrone or derivatives thereof with halogen or agents supplying halogen or with different halogens or agents supplying such different halogens in inorganic liquids having from neutral to acid reaction at temperatures below 60° C. Such liquids comprise water, inorganic oxygen acids, such as for example sulphuric acid, oleum, chlorsulphonic acid, phosphoric acid, perchloric acid and the like, or inorganic halogenating agents themselves such for example as sulphuryl chloride, phosphorus oxychloride, iodomonochloride, or mixtures thereof with other halogenating agents, for example a mixture of phosphorous oxychloride and phosphorus pentachloride. The halogenation is preferably carried out with the aid of halogenating catalysts, such as for example iodine, sulphur, iron, mercury, bismuth, antimony and compounds thereof. Halogenation may also be effected by means of halogens under atmospheric pressure in the absence of any diluting medium. When halogenating allo-ms-naphthodianthrones in acid solution or in other inorganic liquids at higher temperatures sometimes partial or complete condensation of the initial material to ms-anthradianthrone occurs simultaneously with the halogenation. In this case halogenation may also be carried out in melts or mixtures of metal chlorides, such for instance as a mixture of aluminium chloride and sodium chloride or iron chloride and sodium chloride. The chloro-, bromo-, iodo-, chloroiodo-, chlorobromo- or chlorobromoiodo derivatives obtainable in the manner aforesaid are in part the same as the halogen derivatives of allo-ms-naphthodianthrone and ms-anthradianthrone obtained according to application No. 199,420, filed June 16, 1927 and application No. 296,085, filed July 28, 1928. In part, however, new valuable halogen derivatives of the said dyestuffs are also obtained when working in the manner aforesaid.

An important advantage of the process according to our invention, when carried out in chlorsulphonic acid or oleum, consists in the fact that the halogen employed can thereby be utilized almost quantitatively, that is without any escape of halogen in the form of halogen hydride, into the compounds subjected to halogenation. Moreover, the recovery of the dissolving or suspending medium and the drying of the crude dyestuff and the reprecipitating of it from sulphuric acid may be dispensed with as the dyestuffs are, when working according to our invention, for the most part obtained directly in the form of a paste.

Quantitative yields are for the most part obtained when working according to our invention. Generally speaking, the dyestuffs dye vegetable fibres from violet vats orange yellow to blue red shades and dissolve in concentrated sulphuric acid for the most part to pure green, violet or blue solutions. The dyestuffs are, generally speaking, obtained in a very pure form. They may, however, be purified, if desired, by the usual and known purifying methods, if desired, even during halogenation, for instance, by way of the oxonium salts formed in sulphuric acid solution which are decomposed by the addition of water, or by treating their pastes with oxidizing agents, for instance, by treating their aqueous suspension with a solution of a hypochlorite, or by recrystallization from organic solvents in which, generally speaking, they are difficulty soluble or by extracting the crude halogenation products with the said solvents, or by sublimation, if desired, under diminished pressure.

The following examples will further illustrate how the said invention may be carried out in practice, but the invention is not restricted to these examples. The parts are by weight.

Example 1

10 parts of bromine are poured over 10 parts of allo-ms-naphthodianthrone obtainable according to the said application No. 199,420 and the mixture is allowed to stand for 40 hours at ordinary temperature. Thereupon the reaction mixture is poured into a dilute solution of caustic soda, filtered by suction, and the filter cake is washed until neutral and dried. The dyestuff formed is a brown orange powder dissolving in concentrated sulphuric acid to a green solution and dyes cotton from a violet vat strong orange red shades.

A dyestuff of similar tinctorial properties but dyeing a more yellowish tinge is obtained by passing vapours of bromine over finely divided allo-ms-naphthodianthrone at between 50° and 100° C.

A product dyeing still more yellowish shades is obtained by employing gaseous chlorine instead of the vapours of bromine.

Example 2

40 parts of bromine are introduced into 406 parts of a 10 per cent aqueous paste of allo-ms-naphthodianthrone at ordinary temperature, while stirring, and the whole is then slowly warmed to about 60° C., while the reaction mass is suitably kept neutral by slowly introducing a dilute solution of caustic soda. Stirring is continued at between 70° and 80° C. until a sample furnishes orange red dyeings on cotton. The dyestuff formed is filtered by suction and washed until neutral and forms an orange red paste and an orange red powder, when dry, dissolving to a green solution in concentrated sulphuric acid.

Example 3

200 parts of allo-ms-naphthodianthrone are dissolved, while stirring, in 2000 parts of chlorsulphonic acid, whereupon 15 parts of iodine and 180 parts of bromine are added to the solution at ordinary temperature, the whole being stirred for one hour at ordinary temperature. The reaction mixture is then warmed to between 45° and 50° C. and kept at the said temperature until the bulk of the bromine is taken up. The reaction mass is then allowed to cool, diluted with 1000 parts of concentrated sulphuric acid, poured into water and filtered by suction. The dyestuff obtained is a red paste forming an orange red powder, when dry, crystallizing from nitrobenzene in compact blue red needles, dissolving in concentrated sulphuric acid to a blue green solution and dyeing cotton strong clear very fast scarlet red shades from a violet vat.

Other catalysts, for instance antimony, selenium, phosphorus, iron, manganese, nickel, mercury, tungsten, molybdenum and the like may be added instead of iodine.

Example 4

40.6 parts of allo-ms-naphthodianthrone are dissolved, while stirring, in 406 parts of chlorsulphonic acid and 4 parts of sulphur, and 30 parts of bromine are added to the solution at ordinary temperature. The whole is stirred for 1 hour and then heated to between 40° and 45° C. and kept at this temperature until all of the bromine is taken up. The reaction mixture is then allowed to cool and worked up as described in the foregoing example. The dyestuff obtained, a tribromo-allo-ms-naphthodianthrone, is an orange red paste which, when dry, forms a brown red powder, crystallizes from organic solvents of a high boiling point in needles, dissolves to a green solution in concentrated sulphuric acid and dyes cotton from a violet vat extremely powerful and brilliant scarlet shades of very good fastness.

If only 8.8 parts of bromine be employed instead of 30 parts of bromine, a monobromo-allo-ms-naphthodianthrone is obtained and when employing 17.6 parts of bromine, a dibromo-allo-ms-naphthodianthrone is obtained, both products dyeing shades with a somewhat more yellowish tinge than the bromo-derivative hereinbefore described.

Oleum or a mixture of oleum and chlorsulphonic acid may be used as dissolving media instead of chlorsulphonic acid.

Products dyeing similar shades are also obtained by introducing into a solution of allo-ms-naphthodianthrone in chlorsulphonic acid dry hydrogen bromide in the presence of iodine or sulphur.

Example 5

4.06 parts of allo-ms-naphthodianthrone are heated for ½ hour at between 100° and 110° C. with 25 parts of phosphorus pentachloride in 50 parts of phosphorus oxychloride. The reaction mixture is then poured into water and the reaction product filtered by suction, washed until neutral and dried. The chlorinated product obtained which in part consists of chloro-ms-anthradianthrone dissolves in concentrated sulphuric acid to give an olive green solution and dyes cotton orange shades from a violet vat.

Example 6

40.6 parts of purest allo-ms-naphthodianthrone, obtainable by crystallization or sublimation or by means of its oxonium sulphate, are dissolved, while stirring, in 400 parts of chlorsulphonic acid, whereupon 4 parts of iodine are added to the said solution, and a current of chlorine is passed through until the weight of the reaction mixture has increased by from 8 to 10 parts. The reaction product obtained by working up the reaction mixture in the usual way is an orange-red paste and a yellow red powder, when dried, dissolves in concentrated sulphuric acid to give a green solution, crystallizes in red needles and dyes cotton strong brilliant red orange shades from a blue vat.

By continuing the introduction of chlorine higher chlorinated reaction products, namely from tri- to tetra-halogen derivatives, are obtained which dye red shades.

In a similar manner a reaction product, which likewise dyes red shades, containing chlorine and bromine is produced by the addition of bromine to the reaction mixture, into which chlorine has been introduced, and raising the reaction temperature to between 40° and 50° C.

Products containing chlorine and bromine may also be obtained by first introducing bromine into the initial material, and then further chlorinating the bromo derivative obtained. In the said manner halogen-allo-ms-naphthodianthrones produced by another method and which are still capable of taking up halogen may be further halogenated.

Sulphuric acid, phosphoric acid or oleum may be used as diluting media instead of chlorsulphonic acid.

*Example 7*

59 parts of dichlordiphenoxy-allo-ms-naphthodianthrone (obtainable by chlorinating the diphenoxy-allo-ms-naphthodianthrone, which may be produced by condensation of dichlor-allo-ms-naphthodianthrone with potassium phenolate, with sulphuryl chloride in nitrobenzene) are dissolved, while stirring, at between 20° and 30° C. in 590 parts of chlorsulphonic acid. After the addition of 2 parts of sulphur and 30 parts of bromine the reaction mixture is stirred for several hours at between 35° and 40° C., allowed to cool and worked up as usual. The bromodichlorodiphenoxy-allo-ms-naphthodianthrone obtained is a red paste and a red powder, when dried, dissolves in concentrated sulphuric acid to give a green solution and dyes cotton red shades of good fastness from a blue vat.

A red dyeing bromo derivative may be obtained in an analogous manner from diphenoxy-allo-ms-naphthodianthrone.

What we claim is:—

1. A process for the manufacture of halogenated allo-ms-naphthodianthrones, which comprises causing a halogenating agent to react with an allo-ms-naphthodianthrone in an inorganic oxygen acid at temperatures between ordinary atmospheric temperature and 60° C.

2. A process for the manufacture of halogenated allo-ms-naphthodianthrones, which comprises causing a halogenating agent to react with an allo-ms-naphthodianthrone in an inorganic oxygen acid at temperatures between ordinary atmospheric temperature and 60° C. with the aid of a halogenating catalyst.

3. A process for the manufacture of halogenated allo-ms-naphthodianthrones, which comprises causing a halogenating agent to react with an allo-ms-naphthodianthrone in chlorsulphonic acid at temperatures between ordinary atmospheric temperature and 60° C.

4. A process for the manufacture of halogenated allo-ms-naphthodianthrones, which comprises causing a halogenating agent to react with an allo-ms-naphthodianthrone in chlorsulphonic acid at temperatures between ordinary atmospheric temperature and 60° C. with the aid of a halogenating catalyst.

5. As a new article of manufacture tribromo-allo-ms-naphthodianthrone, which forms an orange red paste and a brown red powder, when dried, crystallizes from organic solvents of high boiling point in needles, dissolves to a green solution in concentrated sulphuric acid and dyes cotton from a violet vat powerful and brilliant scarlet shades.

In testimony whereof, we affix our signatures.

MAX ALBERT KUNZ.
KARL KOEBERLE.